United States Patent
Oonishi et al.

(10) Patent No.: US 10,780,513 B2
(45) Date of Patent: Sep. 22, 2020

(54) WIRE ELECTRICAL DISCHARGE MACHINING SYSTEM

(71) Applicant: FANUC CORPORATION, Yamanashi (JP)

(72) Inventors: Takurou Oonishi, Yamanashi (JP); Takashi Nagatomi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 421 days.

(21) Appl. No.: 15/601,109

(22) Filed: May 22, 2017

(65) Prior Publication Data

US 2017/0341172 A1    Nov. 30, 2017

(30) Foreign Application Priority Data

May 25, 2016 (JP) .................. 2016-103925

(51) Int. Cl.
*B23H 7/02*    (2006.01)
*B23H 1/08*    (2006.01)
(Continued)

(52) U.S. Cl.
CPC .................. *B23H 7/02* (2013.01); *B23H 1/08* (2013.01); *B23H 1/10* (2013.01); *B23H 7/20* (2013.01);
(Continued)

(58) Field of Classification Search
CPC ... H04L 5/0007; H04L 5/0046; B23H 11/003; B23H 1/08; B23H 1/10; B23H 2500/00; B23H 7/02; B23H 7/20
(Continued)

(56) References Cited

U.S. PATENT DOCUMENTS 4,626,645 A  12/1986 Inoue et al.
4,751,361 A  6/1988 Inoue et al.
(Continued)

FOREIGN PATENT DOCUMENTS

CN  102892539 A  1/2013
CN  202726588 U  2/2013
(Continued)

OTHER PUBLICATIONS

Japanese Office Action dated May 15, 2018 in corresponding Japanese Patent Application No. 2016-103925; 8 pgs.
(Continued)

*Primary Examiner* — Dana Ross
*Assistant Examiner* — Joseph W Iskra
(74) *Attorney, Agent, or Firm* — Maier & Maier, PLLC

(57) ABSTRACT

A wire electrical discharge machining system includes a securing device that is placed at a cut position where a workpiece on a holding unit has been cut by wire electrical discharge machining when the wire electrical discharge machining has been performed on the workpiece held on the holding unit to reach a predetermined position before the completion of machining and that individually attracts a cut-out portion from the workpiece and a remaining portion on the workpiece at the cut position where the workpiece has been cut, thereby securing the cut-out portion to the remaining portion, and a robot is configured to individually attract both the cut-out portion and the remaining portion with the securing device.

6 Claims, 7 Drawing Sheets

(51) Int. Cl.
  *B23H 1/10* (2006.01)
  *B23H 7/20* (2006.01)
  *B23H 11/00* (2006.01)
(52) U.S. Cl.
  CPC ........ *B23H 11/003* (2013.01); *B23H 2500/00* (2013.01)
(58) Field of Classification Search
  USPC ...................................................... 219/69.12
  See application file for complete search history.

(56) References Cited

U.S. PATENT DOCUMENTS

| | | | |
|---|---|---|---|
| 6,024,392 | A | 2/2000 | Blatt |
| 2005/0161441 | A1* | 7/2005 | Takayama ................ B23H 7/02 219/69.12 |
| 2008/0173618 | A1 | 7/2008 | Chen et al. |
| 2009/0249606 | A1* | 10/2009 | Diez ....................... B23K 11/11 29/428 |
| 2013/0043217 | A1 | 2/2013 | Yuzawa et al. |
| 2014/0014625 | A1 | 1/2014 | Yamaoka et al. |

FOREIGN PATENT DOCUMENTS

| | | |
|---|---|---|
| CN | 104493321 A | 4/2015 |
| DE | 20 2012 100 384 U1 | 7/2013 |
| EP | 0 145 138 A1 | 6/1985 |
| EP | 2684633 A2 | 1/2014 |
| JP | S60-062419 A | 4/1985 |
| JP | S60-180726 | 9/1985 |
| JP | 61-008224 A | 1/1986 |
| JP | S63-22220 A | 1/1988 |
| JP | H01-64329 U | 4/1989 |
| JP | H02-70932 U | 5/1990 |
| JP | H04-70428 U | 6/1992 |
| JP | H05-4118 | 1/1993 |
| JP | H05-212621 A | 8/1993 |
| JP | H06-238520 A | 8/1994 |
| JP | 2002-001618 A | 1/2002 |
| JP | 2013-144335 A | 7/2013 |
| JP | 2014-14907 A | 1/2014 |
| JP | 2015-145055 A | 8/2015 |
| JP | 2016-016489 A | 2/2016 |
| RU | 131 326 U1 | 8/2013 |

OTHER PUBLICATIONS

Search Report dated Apr. 5, 2018 in corresponding Japanese Patent Application No. 2016-103925; 18 pgs.

Japanese Decision to Grant a Patent dated Dec. 11, 2018, in connection with corresponding JP Application No. 2016-103925 (6 pgs., including machine-generated English translation).

Chinese Office Action dated Apr. 25, 2019, in connection with corresponding CN Application No. 201710341863.9 (10 pgs., including English translation).

* cited by examiner

WIRE ELECTRICAL DISCHARGE MACHINING SYSTEM

CROSS-REFERENCE TO RELATED APPLICATIONS

This application is based on and claims priority to Japanese Patent Application No. 2016-103925 filed on May 25, 2016, the entire content of which is incorporated herein by reference.

TECHNICAL FIELD

The present invention relates to wire electrical discharge machining systems. More specifically, the present invention relates to a wire electrical discharge machining system including wire electrical discharge machine and a robot that changes a workpiece that is set in the wire electrical discharge machine or a robot that, inspects the workpiece after machining or a cut-out portion cut out from the workpiece.

BACKGROUND ART

There are known wire electrical discharge machining systems of this type, including a wire electrical discharge machining system provided with wire electrical discharge machine having a holding unit that holds a workpiece to be machined and provided with a robot arm that supports at its distal-end portion a cut-out portion of the workpiece held by the holding unit, wherein the distal-end portion of the robot arm is secured to the cut-out portion of the workpiece shortly before the completion of machining, and the cut-out portion is supported by the distal-end portion, whereby the cut-out portion is prevented from hanging down by its own weight just before the completion of machining (e.g., see Patent Literature 1).

CITATION LIST

Patent Literature

{PTL 1}
Japanese Unexamined Patent Application, Publication No. Sho 61-8224

SUMMARY OF INVENTION

An aspect of the present invention is a wire electrical discharge machining system including: a holding unit that holds a workpiece to be machined by wire electrical discharge machining; and a robot that changes the workpiece on the holding unit, that inspects the workpiece after the wire electrical discharge machining, or that inspects a cut-out portion cut out from the workpiece by the wire electrical discharge machining, the wire electrical discharge machining system comprising a securing device, wherein the securing device is placed, when the wire electrical discharge machining has been performed on the workpiece held on the holding unit to reach a predetermined position before completion of the machining, at a cut position where the wire electrical discharge machining has been performed, and the securing device individually attracts a cut-out portion of the workpiece and a remaining portion of the workpiece at the cut position where the workpiece has been cut, thereby the securing device secures the cut-out portion to the remaining portion, wherein the robot is configured to cause the securing device to individually attract the cut-out and the remaining portion.

DESCRIPTION OF EMBODIMENTS

A wire electrical discharge machining system according to a first embodiment of the present invention will be described below with reference to the drawings.

Figure 1:
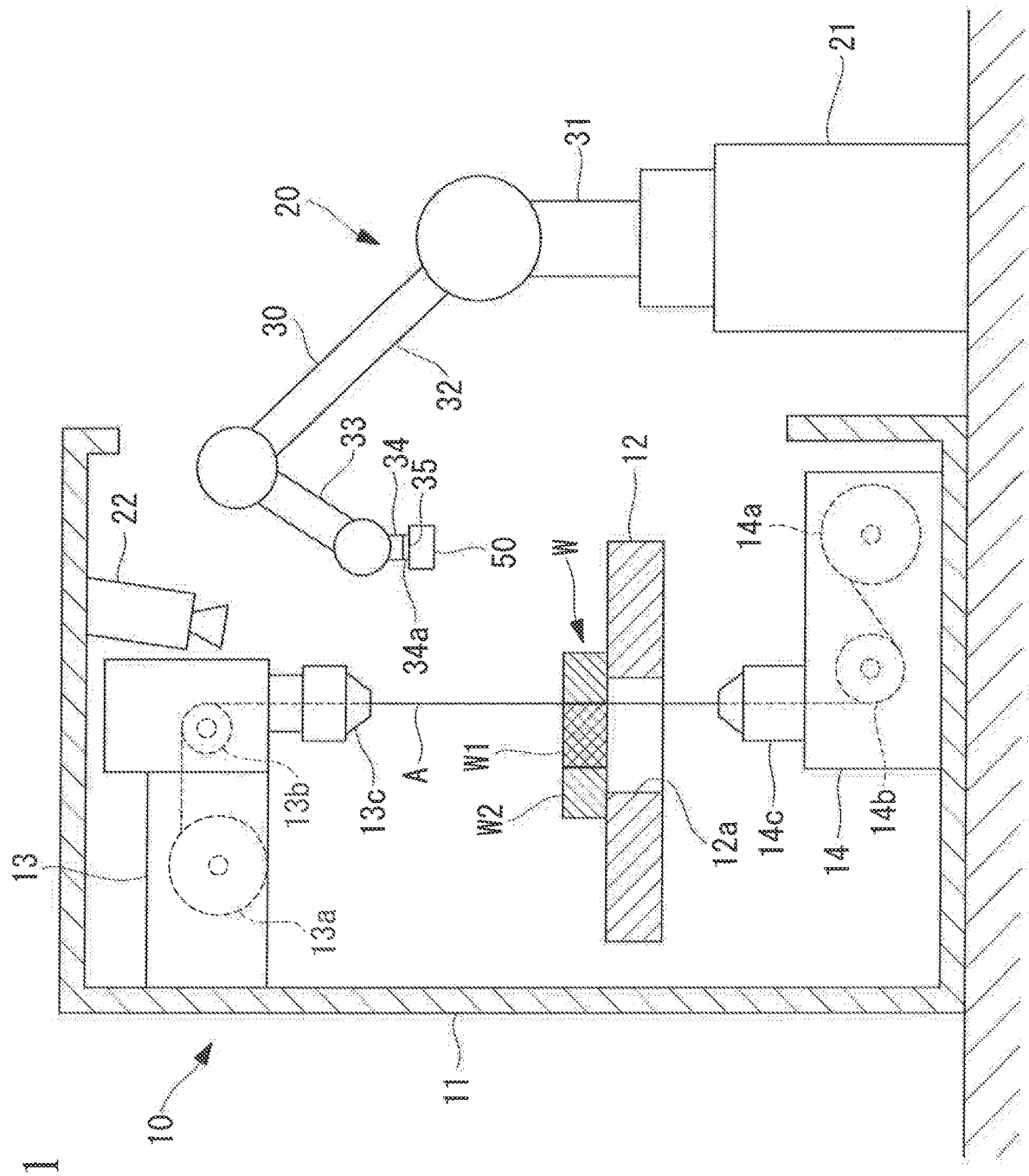
FIG. 1 is an illustration schematically showing the configuration of a wire electrical discharge machining system according to a first embodiment of the present invention.

As shown in FIG. 1, the wire electrical discharge machining system includes wire electrical discharge machine 10 and a robot 20 having a robot arm 30 for changing workpieces W that are set in the wire electrical discharge machine 10. It is possible to use known wire electrical discharge machine as the wire electrical discharge machine 10. In the following description, it is assumed that the horizontal direction (the direction parallel to the grounded faces of the wire electrical discharge machine 10 and the robot 20) in FIG. 1 is the X direction, the depth direction in FIG. 1 is the Y direction, and the vertical direction in FIG. 1 is the Z direction.

In this embodiment, the wire electrical discharge machine 10 includes a frame 11, a holding unit 12 supported by the frame 11, such as a machining table, a wire feeding unit 13 supported by the frame 11 and disposed above the holding unit 12, a wire collecting unit 14 supported by the frame 11 and disposed below the holding unit 12, and a power supply unit (not shown) that applies voltage pulses to a wire A.

The holding unit 12 has a flat workpiece-mounting face on top of it, and it immobilizes a workpiece W on the workpiece-mounting face by holding, with a chuck (not shown), the periphery of the workpiece W mounted on the workpiece-mounting face. Furthermore, the holding unit 12 has an opening 12a that is provided at a central region thereof so as to penetrate the holding unit 12 in the vertical direction. A cut-out portion W1 from the workpiece W is placed at the position of the opening 12a. The wire electrical discharge machine 10 also includes a vessel for immersing the workpiece W immobilized at the holding unit 12 in pure water.

The wire feeding unit 13 includes a reel 13a on which the wire A is wound, a pulley 13b that guides the wire A from the reel 13a, and an upper wire guide 13c having a guide hole 13c through which the wire A passes after passing by the pulley 13b.

The wire collecting unit 14 includes a reel 14a that winds the wire A, a pulley 14b that guides the wire A to the reel 14a, and a lower wire guide 14c having a guide hole through which the wire A passes before passing by the pulley 14b.

The wire A that has passed through the guide hole of the upper wire guide 13c passes by the position of the workpiece W on the holding unit 12, passes through the guide hole of the lower wire guide 14c, and is collected by the reel 14a.

Here, each of these guide holes has an inner diameter that is slightly larger than the outer diameter of the wire A. Furthermore, a predetermined tension is applied to the wire A between the upper wire guide 13c and the lower wire guide 14c by the reel 13a, the pulley 13b, the pulley 14b, and the reel 14a. Thus, it is possible with the upper wire guide 13c and the lower wire guide 14c to place the wire A at the accurate position of the workpiece W on the holding unit 12.

Furthermore, similarly to known wire electrical discharge machine, the upper wire guide 13c is movable in the X direction and in the Y direction by an upper-guide driving mechanism (not shown). This makes it possible to place the wire A not only in the direction parallel to the Z axis but also tilted in the X direction and the Y direction, thereby tilting the cutting face of the workpiece W in the X direction and the Y direction.

Furthermore, similarly to known wire electrical discharge machine, the holding unit 12 is movable in the X direction and the Y direction by a table driving mechanism not shown). Thus, the workpiece W is moved relative to the wire A along a machining trajectory, whereby a portion (the cut-out portion W1) of the workpiece W is cut out.

The robot 20 has a base 21. The robot arm 30 includes a root section 31 supported by the base 21 so as to be rotatable about an axis extending in the vertical direction (the Z axis), a proximal arm 32 supported by the root section 31 so as to be rotatable about an axis extending in a substantially horizontal direction, a distal arm 33 supported at the distal end of the proximal arm 32 so as to be rotatable about an axis extending in a substantially horizontal direction, and a chuck part 34 supported at the distal end of the distal arm 33 so as to be rotatable about an axis extending in a substantially horizontal direction. The chuck part 34 is configured such that a distal-end portion 34a thereof is rotatable relative to a proximal-end portion thereof about an axis extending in the vertical direction. Furthermore, a workpiece holding mechanism 35 is provided at the distal end (bottom face) of the chuck part 34; for example, the workpiece holding mechanism 35 holds a metallic workpiece W by means of a magnetic force.

Figure 4:
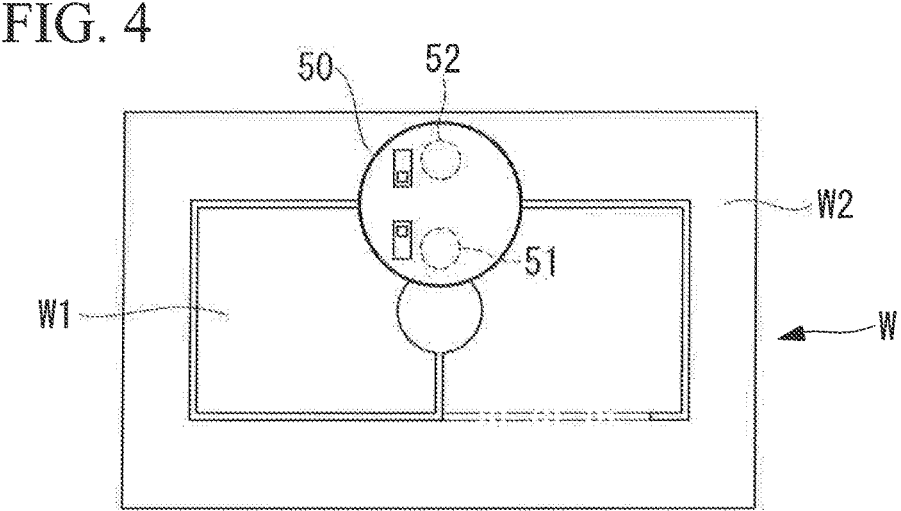
FIG. 4 is an illustration showing an operation of the wire electrical discharge machining system according to the first embodiment.
Figure 6:
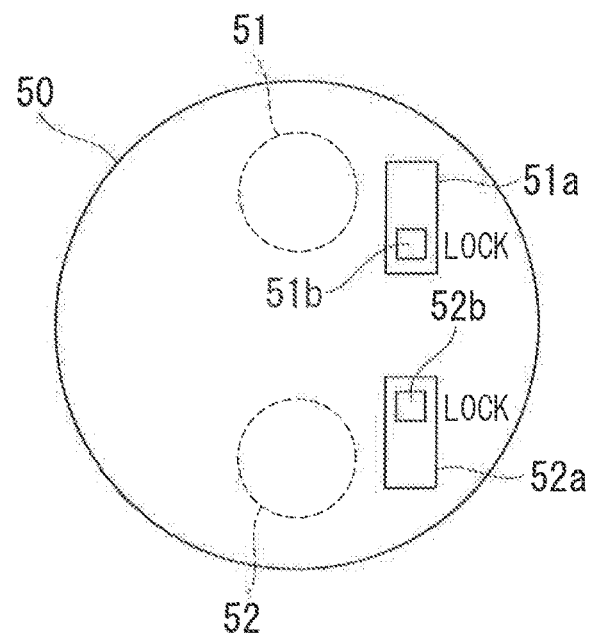
FIG. 6 is a plan view of a securing device in the first embodiment.

The machining system according to this embodiment further includes a metallic securing device 50 that is held and moved by the workpiece holding mechanism 35. As shown in FIGS. 1, 4, 6, etc., for example, the securing device 50 is disk-shaped and has a first attracting part 51 and a second attracting part 52 on the bottom face thereof. In this embodiment, the two attracting parts 51 and 52 individually attract iron by magnetic forces, and the individual magnetic forces are controlled, for example, by magnetic-force adjusting units 51a and 51b respectively having levers 51b and 52b and provided on the top face of the securing device 50.

Specifically, the attracting parts 51 and 52 attract iron when the respective levers 51b and 52b are moved to a locking side, and the attracting parts 51 and 52 do not attract iron when the respective levers 51b and 52b are moved to the side opposite to the locking side.

Figure 5:
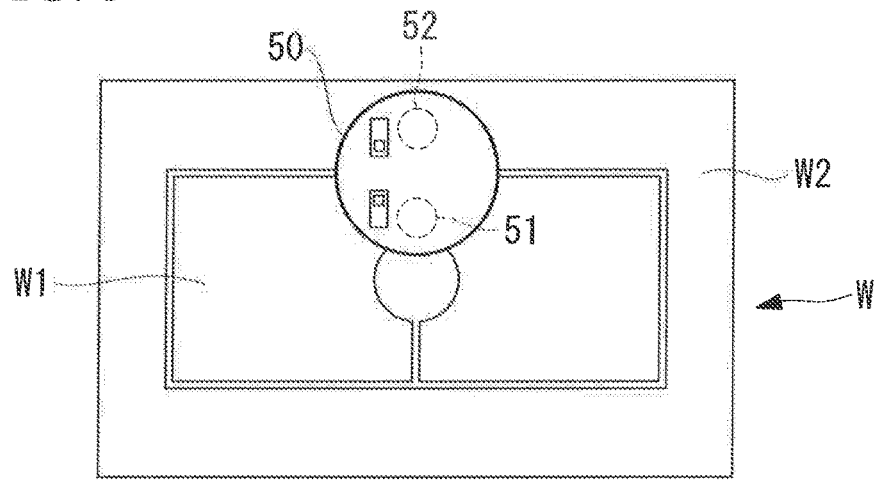
FIG. 5 is an illustration showing an operation of the wire electrical discharge machining system according to the first embodiment.

As shown in FIGS. 4, 5, etc., when wire electrical discharge machining is performed, reaching a predetermined position before the completion of machining, the securing device 50 is placed at the cut position where the workpiece W on the holding unit 12 has been cut by performing wire electrical discharge machining, and the securing device 50 attracts both a cut-out portion W1 and a remaining portion W2 of the workpiece W at the cut position where the workpiece W has been cut, thereby securing the cut-out portion W1 to the remaining portion W2. In this embodiment, the first attracting part 51 attracts the cut-out portion W1, and the second attracting part 52 attracts the remaining portion W2.

Figure 7:
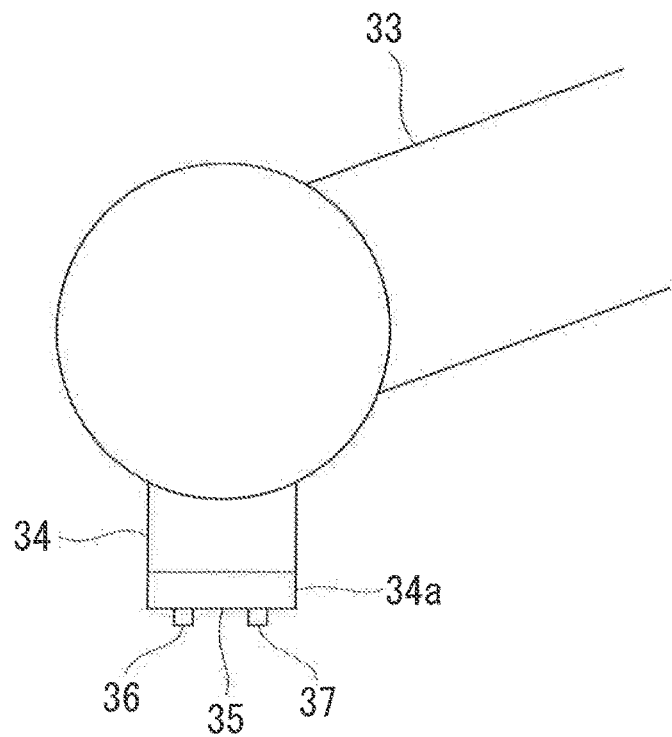
FIG. 7 is a front view of main parts of a robot arm in the first embodiment.

As shown in FIG. 7, the workpiece holding mechanism 35 also includes two lever operating devices 36 and 37 for operating the levers 51b and 52b on the top face of the held securing device 50, respectively. The lever operating devices 36 and 37 are configured to be secured to the respective levers 51b and 52b, for example, in the X direction, and to be moved by the respective motors 36a and 37a, for example, in the Y direction when the securing device 50 is held by the workpiece holding mechanism 35. This enables switching between attraction and release of iron by the individual attracting parts 51 and 52.

The robot arm 30 includes a servo motor 31a for rotation of the root section 31, a servo motor 32a for rotation of the proximal arm 32, a servo motor 33a for rotation of the distal arm 33, a servo motor 34b for rotation of the chuck part 34 relative to the distal arm 33, and a servo motor 34c for rotation of the distal-end portion 34a of the chuck part 34.

Figure 8:
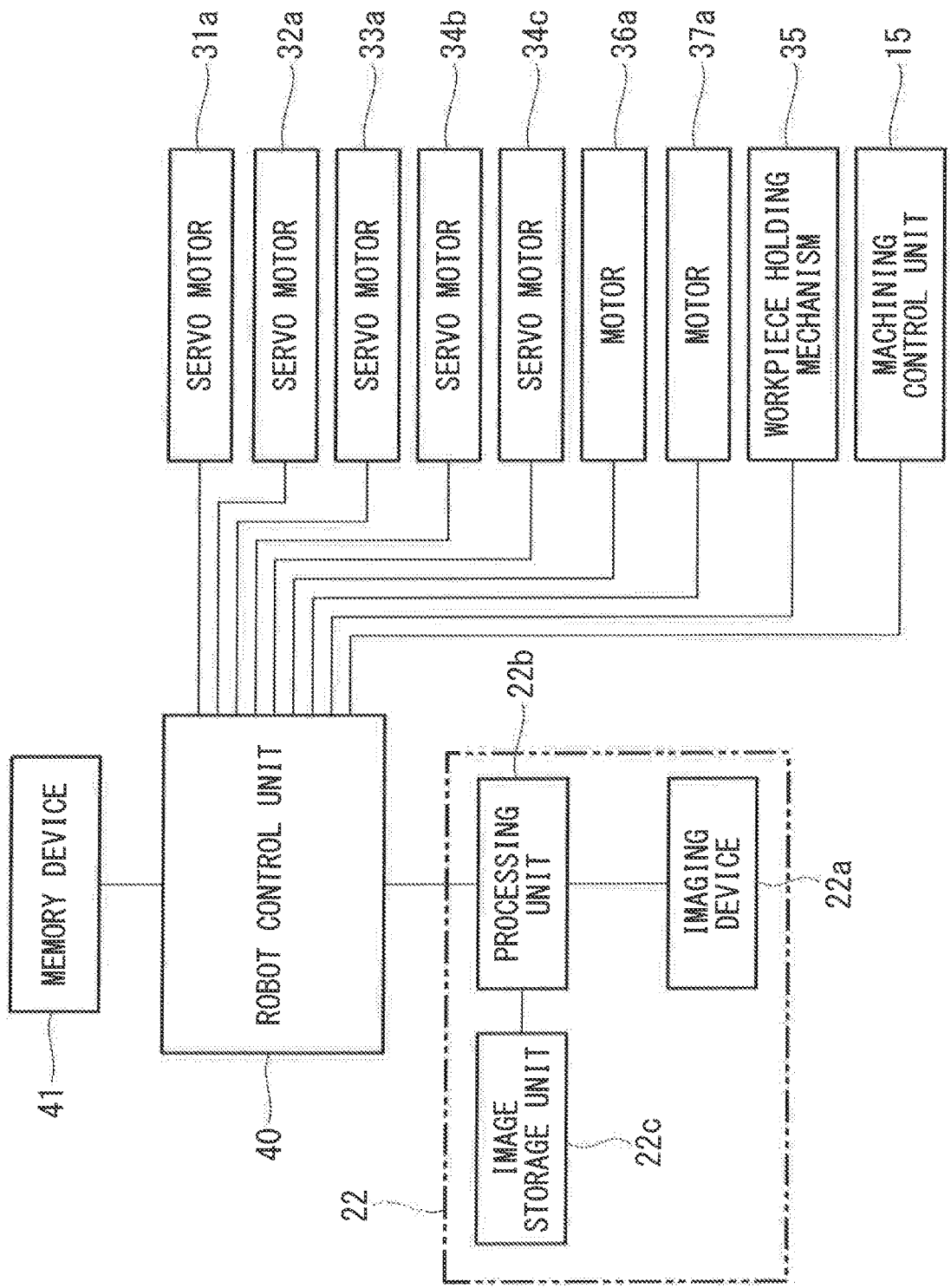
FIG. 8 is a schematic block diagram of the wire electrical discharge machining system according the first embodiment.

As shown in FIG. 8, the individual motors 31a, 32a, 33a, 34b, 34c, 36a, and 37a and the workpiece holding mechanism 35 are connected to a robot control unit 40 and are controlled by the robot control unit 40.

On the other hand, the table driving mechanism and the upper-guide driving mechanism are connected to a machining control unit 15 of the wire electrical discharge machine 10, and the holding unit 12 is moved in the X direction and the Y direction and the upper wire guide 13c is moved in the X direction and the Y direction according to instructions from the machining control unit 15.

The robot 20 also includes a visual sensor 22 that is controlled by the robot control unit 40. In this embodiment, as shown in FIG. 1, the visual sensor 22 is supported by the frame 11 of the wire electrical discharge machine 10; alternatively, however, the visual sensor 22 may be supported by the robot arm 30.

As shown in FIG. 8, the visual sensor 22 includes an imaging device 22a that captures an image of the workpiece W on the holding unit 12, and a processing unit 22b. The image captured by the imaging device 22a is subjected to image processing by the processing unit 22b. Information based on the processed image is sent to the robot control unit 40, and the robot control unit 40 saves the received information based on the processed image in a memory device 41.

The processing unit 22b executes known image processing on the captured image, such as static binarization processing or dynamic binarization processing, and stores the processed image in an image storage unit 22c. The processing unit 22b is a computer having a CPU and a memory, and executes the above image processing according to a predetermined program stored in the memory. The processing unit 22b may send the processed image itself to the robot control unit 40 as information based on the processed image or send information about the range of presence of a machining groove that appears in the processed image, information about the position of the machining groove, or the position of the wire A to the robot control unit 40 as information based on the processed image. In either case, information based on the processed image is information that enables to identify the position where machining is being performed with the wire A. In this embodiment, the processed image itself is sent to the robot control unit 40 as information based on the processed image.

Figure 9:
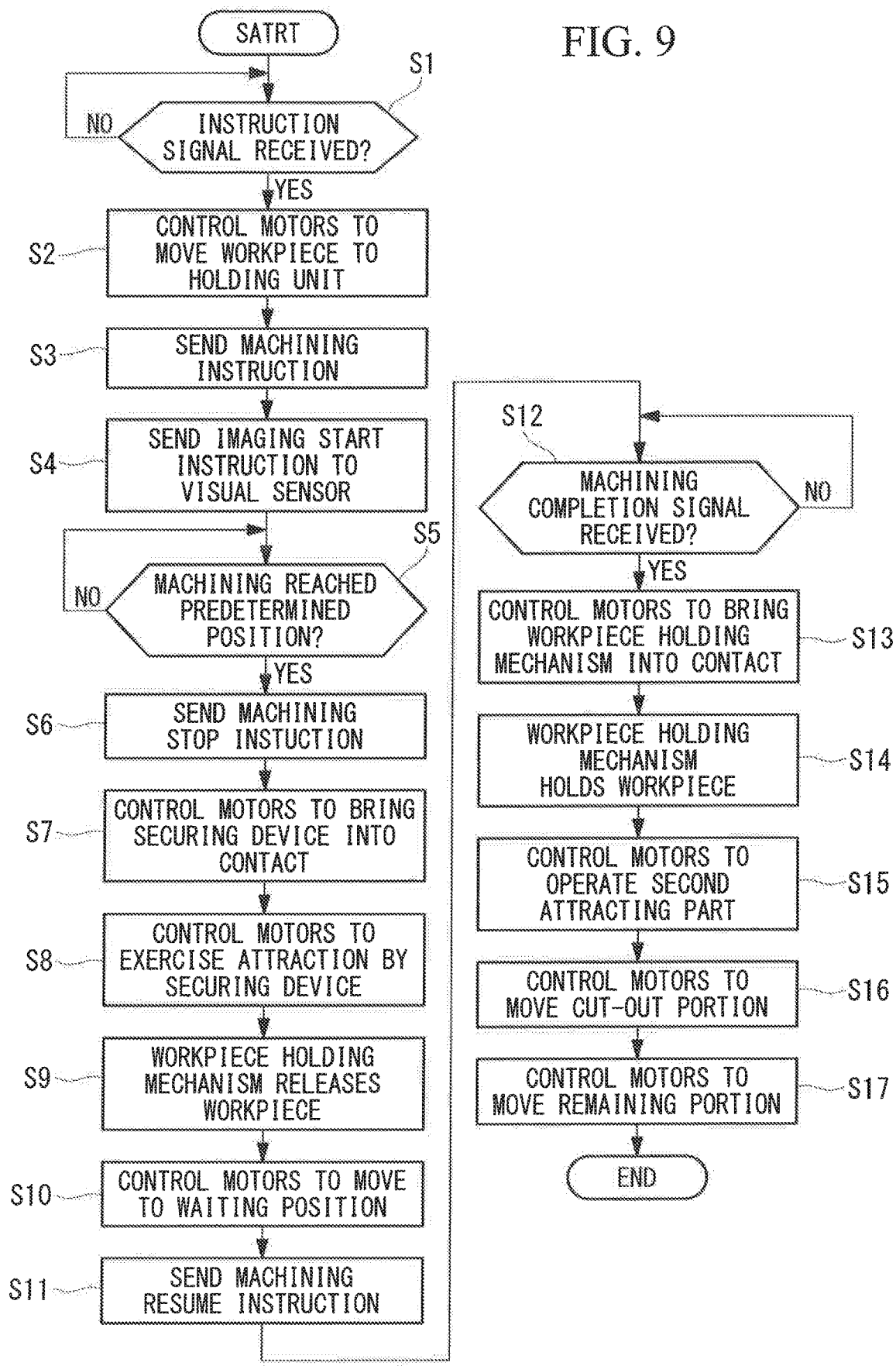
FIG. 9 is a flowchart showing an example of an operation of a robot control unit in the first embodiment.

The robot control unit 40 operates according to a program stored in the memory device 41. The robot control unit 40 controls the individual motors 31a, 32a, 33a, 34b, 34c, 36a, and 37a to move a workpiece W before machining from a pre-machining-workpiece storage area to the holding unit 12 and the workpiece W after machining from the holding unit 12 to a post-machining-workpiece storage area by using the robot arm 30. An example of the operation of the robot control unit 40 at this time will be described with reference to a flowchart in FIG. 9.

For example, when an operator enters an instruction for a start of machining to an input unit (not shown), the robot control unit 40 receives the instruction signal (step S1) and controls the individual motors 31a, 32a, 33a, 34b, 34c, 36a, and 37a so as to move a workpiece before machining from the pre-machining-workpiece storage area to the holding unit 12 (step S2). At this time, a workpiece W before machining may be attracted by the attracting parts 51 and 52 of the securing device 50 and moved from the pre-machining-workpiece storage area to the holding unit 12 with the securing device 50 held by the workpiece holding mechanism 35. Alternatively, a workpiece W before machining may be moved from the pre-machining-workpiece storage area to the holding unit 12 by the workpiece holding mechanism 35 with the securing device 50 not held by the workpiece holding mechanism 35. The former case will be described in the context of this embodiment. Furthermore, after step S2, the robot arm 30 is moved to a predetermined waiting position.

Then, the robot control unit 40 sends a machining instruction to the machining control unit 15 of the wire electrical discharge machine 10 (step S3). Accordingly, the wire electrical discharge machine 10 starts cutting the workpiece W on the holding unit 12 along a predetermined trajectory. Furthermore, the robot control unit 40 sends an imaging start instruction to the visual sensor 22 to instruct the imaging device 22a to capture images at predetermined intervals (step S4). Accordingly, the robot control unit 40 receives processed images at the predetermined intervals, and the received processed images are saved in the memory device 41.

Figure 3:
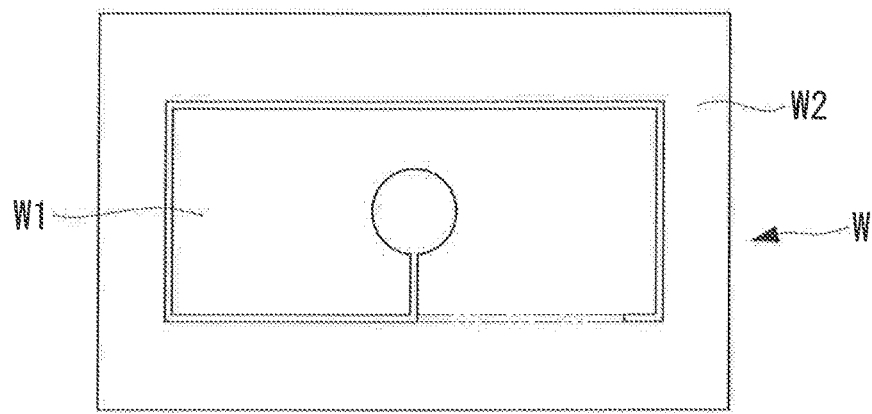
FIG. 3 is an illustration showing an operation of the wire electrical discharge machining system according to the first embodiment.

Then, the robot control unit 40 determines whether or not the position of machining with the wire A has reached a predetermined position before the completion of machining in a received processed image (step S5). When the machining position has reached the predetermined position in step S5, the robot control unit 40 sends a machining stop instruction to the machining control unit 15 of the wire electrical discharge machine 10 (step S6). For example, as shown in FIG. 3, the robot control unit 40 sends a machining stop instruction at a position just before the completion of machining.

At this time, the robot control unit 40 should preferably determine the position at which the securing device 50 is to be attached or the orientation of the securing device 50 by using the received processed image. For example, in the case where the range of presence of a machining groove is recognized from the processed image, as shown in FIG. 3, of the cut position where the workpiece W has been cut by performing wire electrical discharge machining, a position at which a cut-out portion W1 will be supported stably by the first attracting part 51 may be chosen as the position at which the securing device 50 is to be attached. Furthermore, even in the case where the robot control unit 40 cannot obtain information about a planned trajectory for wire electrical discharge machining from the machining control unit 15, etc., it is possible to estimate from the processed image the position of the center of gravity of the cut-out portion W1, which is advantageous in stably supporting the cut-out portion W1.

Figure 2:
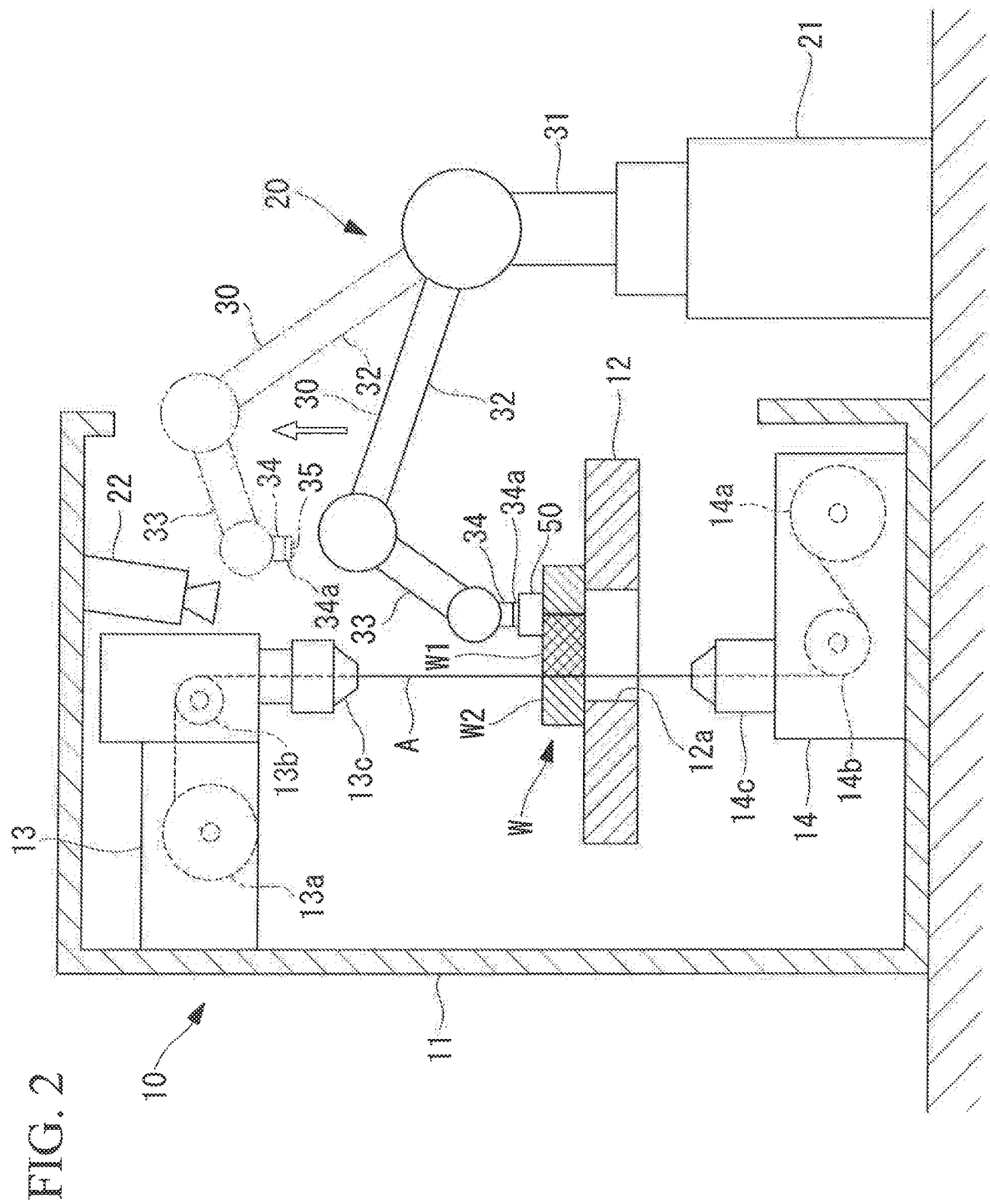
FIG. 2 is an illustration showing an operation of the wire electrical discharge machining system according to the first embodiment.

Then, as shown in FIG. 2, the robot control unit 40 controls the individual motors 31a, 32a, 33a, 34b, and 34c so that the first attracting part 51 of the securing device 50 held by the workpiece holding mechanism 35 comes into contact with the cut-out portion W1 of the workpiece W on the holding unit 12 and so that the second attracting part 52 comes into contact with the remaining portion W2 (step S7). Furthermore, the robot control unit 40 controls the individual motors 36a and 37a so that the first attracting part 51 and the second attracting part 52 come into contact with the cut-out portion W1 and the remaining portion W2, respectively (step S8).

Then, the robot control unit 40 instructs the workpiece holding mechanism 35 to release the securing device 50 (step S9) and moves the robot arm 30 to a predetermined waiting position (step S10). Accordingly, the securing device 50 is secured to the workpiece W, as shown in FIG. 4.

Then, the robot control unit 40 sends a machining resume instruction to the machining control unit 15 of the wire electrical discharge machine 10 (step S11). Accordingly, the wire A is moved to the position at which machining is completed, whereby wire electrical discharge machining of the workpiece W is completed.

For example, when the machining control unit 15 receives a machining completion signal indicating completion of wire electrical discharge machining (step S12), as shown in FIG. 6, the robot control unit 40 controls the individual motors 31a, 32a, 33a, 34b, and 34c so that the workpiece holding mechanism 35 comes into contact with the top face of the securing device 50 (step S13) and instructs the workpiece holding mechanism 35 to hold the securing device 50 (step S14).

Then, the robot control unit 40 controls the motor 37a so that only the attraction by the second attracting part 52 is cancelled (step 15). Accordingly, only the cut-out portion attracted by the securing device 50.

In this state, the robot control unit 40 controls the individual motors 31a, 32a, 33a, 34b, and 34c so that the cut-out portion W1 is moved to and placed at a predetermined transport destination (step S16). Furthermore, the robot control unit 40 controls the individual motors 31a, 32a, 33a, 34b, 34c, 36a, and 37a so that the remaining portion W2 as the workpiece W after machining is moved from the holding unit 12 to the post-machining-workpiece storage area (step S17). Then, the work of machining the workpiece W is terminated.

Alternatively, in steps S15 to S17, both the cut-out portion W1 and the remaining portion W2 may be moved to the post-machining-workpiece storage area with the cut-out portion W1 and the remaining portion W2 both attracted by the securing device 50 and cancel the attraction of the remaining portion W2 in the post-machining-workpiece storage area, thereby moving the remaining portion W2 in the post-machining-workpiece storage area.

As described above, according to this embodiment, in the workpiece W, both the cut-out portion W1 and the remaining portion W2 are attracted by the securing device 50 before the completion of machining, whereby the cut-out portion W1 is secured to the remaining portion W2. Thus, after the workpiece W is attracted by the securing device 50, there is no need to move the robot arm 30 so as to follow the movement of the workpiece W before the completion of machining.

Here, it is preferred to move the securing device 50 with the robot arm 30 to the position where a cutout portion is transported with only the cut-out portion W1 attracted by the securing device 50 after the completion of wire electrical discharge machining. By moving the securing device 50 to the position where the cutout portion is transported, it is possible to reliably separate the cut-out portion W1 from the remaining portion W2 held on the holding unit 12. Furthermore, it becomes possible to improve the efficiency of handling the remaining portion W2, which is the workpiece W after machining.

Furthermore, since the position where the securing device 50 is to be placed in order to attract each of the cut-out portion W1 and the remaining portion W2 is determined by using information based on a processed image, for example, even in the case where the shapes of cut-out portions W1 by wire electrical discharge machining are various and it is not possible to obtain machining trajectories or planned machining trajectories from the wire electrical discharge machine 10, it is possible to determine a position where the securing device 50 is to be placed and to place the securing device 50 accordingly.

Furthermore, since it is possible to obtain information about the range of presence of a machining groove, information about the position of the machining groove, the position of the wire A, etc. by using the visual sensor 22, it becomes possible to readily and reliably determine a position where the securing device 50 is to be placed.

In step S12, alternatively, the robot control unit 40 may determine whether or not wire electrical discharge machining has been completed by using information based on a processed image, received from the visual sensor 22.

Also, in step S5, the robot control unit 40 may receive, from the machining control unit 15, information that enables to identify a machining trajectory and a machined range, such as a machining trajectory, a planned machining trajectory, and a machined trajectory, and determine whether the machining position has reached the predetermined position on the basis of that information.

Also, it is possible to omit step S6. That is, the securing device 50 may be attached to the workpiece W while continuing machining by the wire electrical discharge machine 10.

Also, it is possible to omit step S15. In this case, with both the cut-out portion W1 and the remaining portion W2 attracted by the securing device 50, in step S16, the cut-out portion W1 and the remaining portion W2 are moved to a predetermined transport destination, where only the attraction by the first attracting part 51 is cancelled. Then, the remaining portion W2, attracted by the securing device 50, is moved by the robot arm 30 to the post-machining-workpiece storage area.

Also, the attracting parts 51 and 52 of the securing device 50 may be configured to attract the cut-out portion W1 and the remaining portion W2 of the workpiece W by air sucking forces. In this case, suction holes that serve as attracting parts through which air is sucked are provided individually at the positions of the attracting parts 51 and 52 that attract iron by magnetic forces. Furthermore, valves for opening and closing the individual suction holes are provided instead of the individual magnetic-force adjusting units 51*a* and 52*a*. One ends of air suction pipes are connected to the two suction holes via the individual valves, and the other ends of the each air suction pipes are connected to an air suction device.

Figure 10:
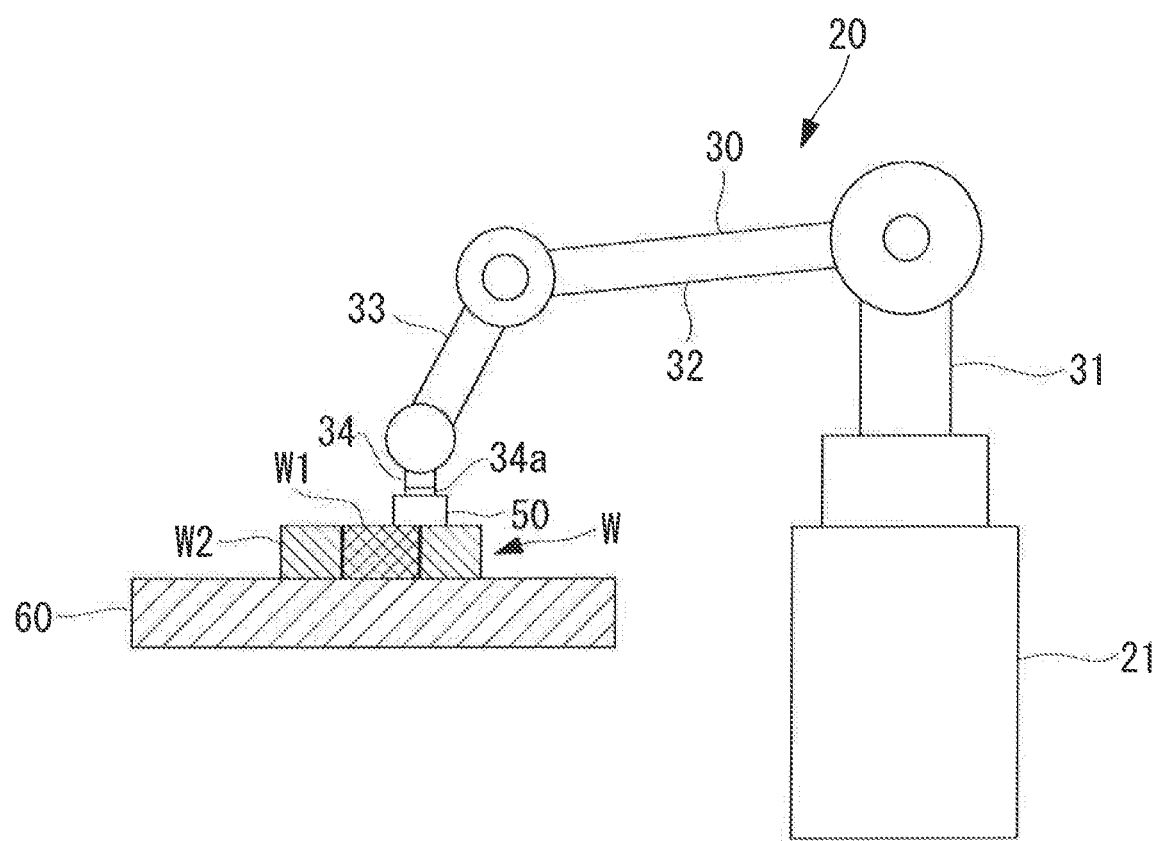
FIG. 10 is an illustration schematically showing the configuration of a wire electrical discharge machining system according to a second embodiment of the present invention.

A machining system according to a second embodiment of the present, invention will be described below with reference to FIG. 10.

This embodiment differs from the first embodiment in that, by utilizing the phenomenon in which a wire component attaches to a workpiece W while the workpiece W is being machined by the wire electrical discharge machine 10, the attached component is deposited in a machining groove of the workpiece W, whereby a cut-out portion W1 is secured to a remaining portion W2. Parts that are configured the same as those in the first embodiment are designated by the same reference signs, and descriptions thereof will be omitted.

In this embodiment, the following processing is executed instead of steps S15 and S16 in the first embodiment. In this embodiment, after holding the securing device 50 with the workpiece holding mechanism 35 in step S14 in the first embodiment, the cut-out portion W1 and the remaining portion W2 are moved to a predetermined transport destination, and the cut-out portion W1 and the remaining portion W2 are placed on a table 60 in that area.

Since the cut-out portion W1 is secured to the remaining portion W2 as a result of depositing the wire component, in order to separate these portions W1 and W2 from each other, with the securing device 50 individually attracting the cut-out portion W1 and the remaining portion W2, placed on the table 60, for example, a hammer section is provided at the distal end of a driving device, such as another robot, and for example an impact is applied to the cut-out portion W1 with the hammer section. The driving unit having the hammer section functions as a separator for separating the cut-out portion W1 and the remaining portion W2 from each other. Alternatively, the impact may be applied with the cut-out portion W1 and the remaining portion W2 not placed on the table 60.

The cut-out portion W1 and the remaining portion W2 are separated from each other by the impact. However, since the securing device 50 individually attracts the cut-out portion W1 and the remaining portion W2, the cut-out portion W1 and the remaining portion W2 are prevented from dropping.

Furthermore, steps S5 to S14 in the first embodiment may be omitted before the above processing in this embodiment. In this case, after step S4 in the first embodiment, upon receiving a machining completion signal indicating the completion of wire electrical discharge machining from the machining control unit 15, the robot control unit 40 determines a position and orientation for attaching the securing device 50 by using a received processed image and attaches the securing device 50 accordingly. At this time, the first attracting part 51 attracts the cut-out portion W1, and the second attracting part 52 attracts remaining the portion W2. Then, similarly to the case described above, the cut-out portion W1 and the remaining portion W2 are moved to the predetermined transport destination together with the securing device 50, and the cut-out portion W1 and the remaining portion W2 are separated from each other by the driving device having the hammer section. Also in this case, the cut-out portion W1 and the remaining portion W2 are prevented from dropping.

Furthermore, in this embodiment, it is also possible to omit steps S5 to S17 in the first embodiment and, with the cut-out portion W1 and the remaining portion W2 after machining placed on the table 60 by another transporting device, to control the robot arm 30 so as to attract the cut-out portion W1 with the first attracting part 51 of the securing device 50 and the remaining portion W2 with the second attracting part 52 of the securing device 50, and to separate the cut-out portion W1 and the remaining portion W2 from each other by the driving device having the hammer section. Also in this case, the cut-out portion W1 and the remaining portion W2 are prevented from dropping.

In the first and second embodiments, the robot 20 may be a robot that changes the workpiece W that is machined by the wire electrical discharge machine 10, a robot that inspects the workpiece W after the wire electrical discharge machining, or a robot that inspects a cut-out portion cut out from the workpiece W.

From the above-described embodiment, the following aspects of the present invention are derived.

An aspect of the present invention is a wire electrical discharge machining system including: a holding unit that holds a workpiece to be machined by wire electrical discharge machining and a robot that changes the workpiece on the holding unit, that inspects the workpiece after the wire electrical discharge machining, or that inspects a cut-out portion cut out from the workpiece by the wire electrical discharge machining, the wire electrical discharge machining system comprising a securing device, wherein the securing device is placed, when the wire electrical discharge machining has been performed on the workpiece held on the holding unit to reach a predetermined position before completion of the machining, at a cut position where the wire electrical discharge machining has been performed, and the securing device individually attracts a cut-out portion of the workpiece and a remaining portion of the workpiece at the cut position where the workpiece has been cut, thereby the securing device secures the cut-out portion to the remaining portion, wherein the robot is configured to cause the securing device to individually attract the cut-out and the remaining portion.

In the first aspect, the securing device individually attracts, in the workpiece, the cut-out portion and the remaining portion before the completion of machining, whereby the cut-out portion is secured to the remaining portion by the securing device. Thus, there is no need to move the robot so as to follow movement of the workpiece after the workpiece is attracted with the securing device.

In the first aspect, preferably, after the completion of the wire electrical discharge machining on the workpiece, the robot moves the securing device to a position for transporting the cut-out portion with the securing device attracting only the cut-out portion.

By moving the securing device to the position for transporting the cut-out portion, as described above, it is possible to reliably separate the cut-out portion from the remaining portion held on the holding unit. Furthermore, it becomes possible to improve the efficiency of handling the remaining portion as the workpiece after machining.

In the above aspect, preferably, a control unit for determining a position where the securing device is to be placed in order to individually attract the cut-out portion and the remaining portion is included.

With this configuration, for example, even in the case where the shapes of cut-out portions by wire electrical discharge machining are various and it is not possible to obtain machining trajectories or planned machining trajectories from wire electrical discharge machine, it becomes possible to determine a position where the securing device is to be placed and to place the securing device accordingly.

In the above aspect, preferably, the attraction by the securing device is performed by employing magnetic forces or suction forces. This makes it possible to readily and reliably perform attraction by the securing device.

Furthermore, in the above aspect, preferably, the control unit determines the position where the securing device is to be placed on the basis of a result of detection by a visual sensor. Since it is possible with the visual sensor to obtain information about the range of presence of a machining groove, information about the position of the machining groove, the position of the wire, etc., it becomes possible to readily and reliably determine the position where the securing device is to be placed.

Another aspect of the present invention is a wire electrical discharge machining system including: a holding unit that holds a workpiece to be machined by wire electrical discharge machining; and a robot that changes the workpiece on the holding unit, that inspects the workpiece after the wire electrical discharge machining, or that inspects a cut-out portion cut out from the workpiece by the wire electrical discharge machining, in which the wire electrical discharge machining is performed such that a wire component is deposited in a groove after cutting, whereby a cut-out portion cut out from the workpiece is secured to a remaining portion of the workpiece via the wire component, the wire electrical discharge machining system including a securing device that is placed, when the wire electrical discharge machining has been performed on the workpiece held on the holding unit to reach a predetermined position before completion of the machining or a position where machining is completed, at a cut position where the wire electrical discharge machining has been performed and that individually attracts the cut-out portion and the remaining portion at the cut position where the workpiece has been cut, thereby securing the cut-out portion to the remaining portion; and a separator for separating the cut-out portion and the remaining portion from each other by breaking the wire component deposited in the groove with the securing device individually attracting both the cut-out portion and the remaining portion, wherein the robot is configured to cause the securing device to individually attract the cut-out portion and the remaining portion.

Also in the second aspect, since the robot is configured to attract the workpiece with the securing device, as described above, there is no need to move the robot so as to follow the movement of the workpiece after attracting the securing device to the workpiece.

Furthermore, as the robot is provided with the separator for separating the cut-out portion and the remaining portion from each other by breaking the wire component deposited in the groove with the securing device individually attracting both of the cut-out portion and the remaining portion, it is possible to prevent dropping of the cut-out portion or the remaining portion immediately after separation.

According to the aforementioned aspects of the present invention, it is possible to prevent a cut-out portion from hanging down by its own weight just before the completion of machining, without having to move a robot arm so as to follow movement of the workpiece.

REFERENCE SIGNS LIST

10 Wire electrical discharge machine
11 Frame
12 Holding unit
13 Wire feeding unit
13c Upper wire guide
14 Wire collecting unit
14c Lower wire guide
15 Machining control unit
20 Robot
22 Visual sensor
30 Robot arm
35 Workpiece holding mechanism
36 Lever operating device
37 Lever operating device
40 Robot control unit
41 Memory device
50 Securing device
51 First attracting part
52 Second attracting part

The invention claimed is:

1. A wire electrical discharge machining system including a holding unit that holds a workpiece to be machined by wire electrical discharge machining and a robot that changes the workpiece on the holding unit, that inspects the workpiece after the wire electrical discharge machining, or that inspects a cut-out portion cut out from the workpiece by the wire electrical discharge machining, the wire electrical discharge machining system comprising:

a securing device, wherein the securing device is placed, when the wire electrical discharge machining has been performed on the workpiece held on the holding unit to reach a predetermined position before completion of the machining, at a cut position where the wire electrical discharge machining has been performed, and the securing device simultaneously individually attracts a cut-out portion of the workpiece and a remaining portion of the workpiece at the cut position where the workpiece has been cut, thereby the securing device secures the cut-out portion to the remaining portion, wherein the robot is configured to cause the securing device to individually attract the cut-out portion and the remaining portion.

2. The wire electrical discharge machining system according to claim 1, wherein, after the completion of the wire electrical discharge machining on the workpiece, the robot moves the securing device to a destination for the cut-out portion with the securing device attracting only the cut-out portion.

3. The wire electrical discharge machining system according to claim 1, further comprising a control unit for determining a position where the securing device is to be placed in order to individually attract the cut-out portion and the remaining portion.

4. The wire electrical discharge machining system according to claim 1, wherein the attraction by the securing device employs a magnetic force.

5. The wire electrical discharge machining system according to claim 1, wherein the attraction by the securing device employs a suction force.

6. The wire electrical discharge machining system according to claim 3, wherein the control unit determines the position where the securing device is to be placed on the basis of a result of detection by a visual sensor.

* * * * *